(No Model.)
T. G. WALKER.
PROCESS OF SEPARATING SULPHATE OF LIME FROM SALINE SOLUTIONS.
No. 337,900. Patented Mar. 16, 1886.
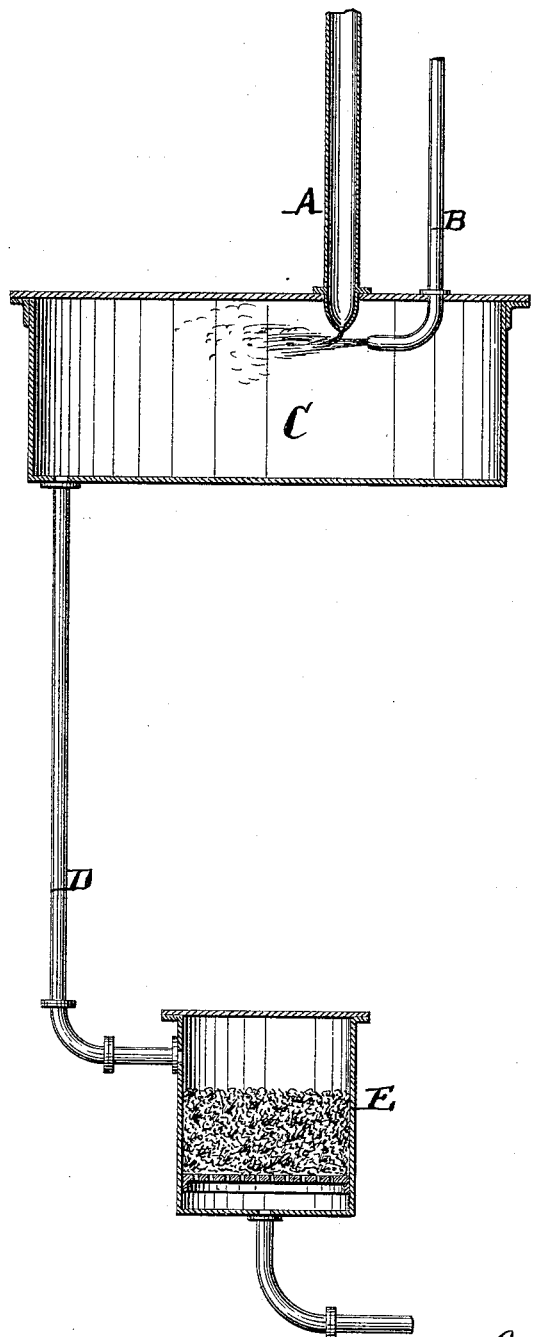
WITNESSES:
A. Schehl.
INVENTOR
Thomas George Walker.
BY Briesen & Steele
ATTORNEYS

UNITED STATES PATENT OFFICE.

THOMAS GEORGE WALKER, OF MORRISTOWN, NEW JERSEY.

PROCESS OF SEPARATING SULPHATE OF LIME FROM SALINE SOLUTIONS.

SPECIFICATION forming part of Letters Patent No. 337,900, dated March 16, 1886.

Application filed December 10, 1885. Serial No. 185,217. (No specimens.)

*To all whom it may concern:*

Be it known that I, THOMAS GEO. WALKER, of Morristown, in the county of Morris, State of New Jersey, have invented an improved Process of Separating Sulphate of Lime from Saline Solutions, of which the following is a complete specification, reference being had to the accompanying drawing, which represents a sectional elevation of apparatus for carrying out my improved process.

This invention has for its object to economically separate from saline solutions the sulphate of lime which they frequently contain. Heretofore such separation has been effectuated in a manner either accidentally and in places where the product was least to be desired, or imperfectly, in which case it frequently constituted an impurity in the product of condensation of the solution.

My invention consists in forcing a jet of steam, superheated, by preference, in a receiving-vessel, against the brine that escapes from a suitable conduit within that vessel. I have found that the steam in atomizing the brine within said receiving-vessel causes the sulphate of lime to crystallize and to settle in the vessel or subsequent conduits of the brine, so as to permit of its ready collection and use in the arts. It is, moreover, an important advantage that the brine is freed from whatever sulphate of lime it may contain, because the latter is regarded as an impurity in brine.

In the accompanying drawing, the letter A represents the end of the pipe conducting the brine, and the letter B the end of a steam-pipe conveying (by preference superheated) steam. The open ends of the pipes A and B are placed in such proximity to one another that the steam will strike the brine that flows from the pipe A and diffuse or atomize it throughout the vessel C, which surrounds the ends of said pipe, as shown in the drawing. As already stated, this atomizing process of the brine causes the sulphate of lime that was carried in solution to crystallize and to be deposited along the inner walls of the vessel C. Any particles of this crystallized sulphate of lime which may not settle along the walls of the vessel C will be carried off by the pipe D, which contains the products of condensation from the vessel C, and may be collected in a suitable filter, E, or a settling tank of ordinary or suitable construction.

I claim as my invention—

The herein-described process of separating sulphate of lime from saline solutions, which process consists in atomizing the solution by a jet of steam, and in thereby crystallizing the sulphate of lime, all as specified.

THOS. GEO. WALKER.

In presence of—
 A. V. BRIESEN,
 HARRY M. TURK.